Patented June 26, 1928.

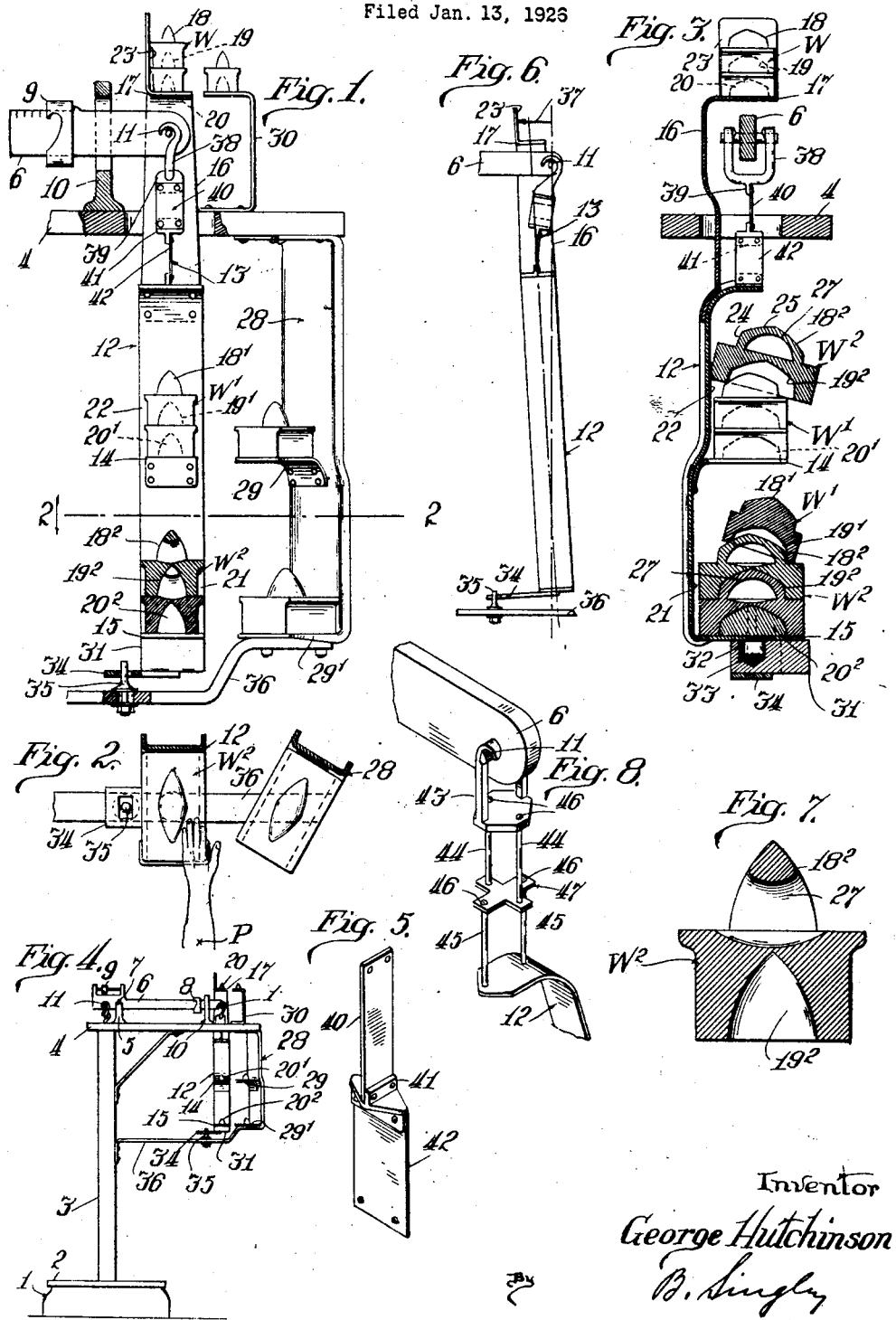

1,674,971

UNITED STATES PATENT OFFICE.

GEORGE HUTCHINSON, OF SHEBOYGAN, WISCONSIN, ASSIGNOR TO HUTCHINSON SCALE COMPANY, OF SHEBOYGAN, WISCONSIN, A CORPORATION OF WISCONSIN.

SCALE.

Application filed January 13, 1926. Serial No. 80,995.

This invention relates to improvements in scales.

It is an object of the invention to provide a scale with suitably constructed means for supporting different size counterweights in proper position while operative relatively to the weighing mechanism and also while inoperative relatively thereto.

In weighing a commodity, particularly on a platform scale under the use of counterweights in addition to the ordinary poise on the beam, the total weight is more quickly computed and with less likelihood of error when each size of weight is in a separate group. In the ordinary hanger the various sizes of weights are usually placed one on top of the other without discrimination as to size or, where different sizes of weights are employed, it is still feasible to combine them in any desired irregular arrangement, whereby computation may readily lead to an error.

Another object of the invention is therefore to provide different supports for different size weights and to retain the weights while in inoperative position on a carrier incorporated with the scale and in proper arrangement to facilitate the transfer of these weights from said carrier to their proper operative position.

This object is accomplished by providing a carrier with several shelves differing in size from each other exclusively adapted for certain size weights only respectively, each of the shelves being arranged and constructed to receive weights of a predetermined size only, and to refuse to seat properly weights of other sizes than those intended for it.

It is also an object of the invention to construct the counterweights themselves in such manner that the weights cannot be supported upon each other indiscriminately, so that weights of the same size only can be placed one on the other.

It is furthermore an object of the invention to facilitate the transfer of weights from operative to inoperative position by arranging corresponding shelves in these positions respectively at the same level, when the scale is in balanced position.

Another object of the invention is to facilitate handling of a large number of weights by equipping the carriers of the weights with corresponding shelves below and above the beam.

It is also an object of the invention to facilitate the transfer and the observation of the weights on each carrier by arranging portions of the carriers or hangers laterally of said shelves or of the weights, as contrasted with known devices in which the hanger is centrally disposed of the seats and weights.

Another object of the invention is to render the supporting means whereby a carrier for the various groups of weights is suspended from the beam flexible in all directions, to allow of a whipping motion of the carrier.

With these and numerous other objects in view, the invention is described in the following specification in which reference is made to the accompanying drawings.

In the drawings:

Figure 1 is partly elevation and partly a sectional view of a portion of a scale provided with the improved counterweights and their supports;

Figure 2 is a section on line 2—2 of Figure 1;

Figure 3 is a vertical sectional view through the beam supported hanger, the weights being shown in elevation;

Figure 4 is an elevation of a platform scale with the improved hangers applied thereto;

Figure 5 is a perspective view of parts of the support for the hanger;

Figure 6 is a detail elevation, to illustrate the effect of a shock upon a portion of the hanger;

Figure 7 is a cross-sectional view thru one of the improved weights, and

Figure 8 is a perspective view of a modified suspension means for the hanger supported from the beam.

The scale illustrated by way of example in Figure 4 comprises a base 1 and a weighing platform 2, the base carrying an upright 3 having a top board 4 on which bearing posts 5 for the beam are mounted. The beam 6 carried on said posts 5 by means of the knife edges 7 may be of any approved construction and is shown as being provided with the poises 8 and 9 for suitable adjustment. Its stroke is limited as shown in Figure 1 by a trig-loop 10 in the ordinary way.

The free end of the beam has knife edges 11 from which the hanger 12 is supported by suspension means indicated as a whole at 13. The hanger 12 preferably is a frame structure of bent sheet metal. Contrary to known constructions, this hanger 12 is provided with seats for counterweights which are laterally of the hanger whereby a portion of said hanger also naturally is laterally of the weights placed upon the seats. The hanger 12 is shown as having two shelves 14 and 15 below the beam and it is provided with an upward extension 16 terminating in a shelf 17 above the beam. These shelves differ in their sizes, the lowermost shelf being the largest one and the shelf above the beam being the smallest one to receive different size weights in proper position; the size of the shelves or seats corresponding generally to the size or area of the weights, the shelves, hanger and weights being constructed in such manner that the different size weights can be properly seated on the pertaining shelves only.

For this purpose the weights indicated at $w$, $w'$, $w^2$ respectively are provided with top seatings 18, 18', $18^2$ and bottom seatings 19, 19', $19^2$ respectively, the seatings comprising projections and recesses respectively different for each size of weight but reciprocally identical with each other. The shelves in their turn are provided with stops 20, 20', $20^2$ projecting upward from the same and adapted to enter the bottom seatings 19, 19', $19^2$ of the weight resting directly on the shelf.

As illustrated in Figures 1, 2 and 3 the projections 20, 20', $20^2$ on the shelves are progressively decreasing in size upward in correspondence to the size of the pertaining weights, and the support 12 presents portions, as at 21, 22, 23, at progressively decreasing horizontal distances from the middle of the projections on the shelves 15, 14, 17 respectively, whereby these portions act as stops for the positioning of the weights on the shelves.

It is obvious, therefore, that for instance a weight $w'$ properly pertaining to the middle shelf 14 cannot be placed on the bottom shelf 15 since the projection $20^2$ on the bottom shelf is too large to fit into the recess or bottom seating 19' of said weight $w'$. The middle weight $w'$ also could not be seated on the top shelf 17 above the beam since the vertical portion 23 on that part would act as a stop. Figure 3 illustrates this condition by way of example in connection with a larger weight $w^2$ and the middle shelf, and the medium size weight $w'$ on the lower shelf 15. This figure also illustrates how the upward projection on a larger weight $w^2$ prevents a smaller weight $w'$ from being stacked thereon. The projections extending from the weights which are shown as being non-circular but oblong in cross-section are also oblong in horizontal cross-section, the projections, however, diminishing upward, as shown in Figure 3, with a steeper slope 24 followed by a less steep slope 25. Owing to this configuration of the projection the stacking operation is facilitated and any relative twist is corrected, thus helping the oncoming weights to find their proper seating. The larger weights may be provided with a handhole or loop 27.

By making the frame non-central but permitting the weights to be seated on the shelves centrally of the shelves, the customary slotting of the weights to enable them to be placed on a hanger provided with a central rod as in known constructions, is dispensed with.

While the description above mentioned makes particular reference to the hanger or weight ladder 12 suspended from the beam 6, the scale also comprises a common support 28 for shelves 29, 29' in a position in which they are not in cooperation with the beam but may be in readiness for transfer to beam-position. This waiting ladder 28 is shown as being secured to the top board 4 and is also preferably made of sheet metal, of a construction similar to that of the other ladder 12. The waiting structure also includes an extension 30 projecting above the beam 3 and likewise secured to the top board 4 of the scale. The arrangement of the shelves on the waiting ladder and the projections on these shelves for fitting into the bottom seating recesses 19, 19', $19^2$ respectively of the lowermost weight of a stack of weights also are identical to that described in connection with the companion hanger or ladder 12, and similarly also corresponding portions of the waiting ladder 28 are arranged relatively to the projections on the pertaining shelves to permit the seating of the proper weights on said shelves only, whereby said portions of the ladders act as stops to prevent displacement of the weights on the pertaining shelves and also render impossible the placing of a larger weight on a shelf pertaining to a smaller size weight. The lower portion of the waiting ladder 28 secured below the top board 4 is provided with shelves which are at the same level as the shelves of the companion ladder 12, as long as the beam is in balanced position. From Figure 2 it will also be apparent that the general plane of the waiting ladder is at an angle to the general plane of the companion ladder 12 so that the major axes of the oblong weights (as well as the major axes of the oblong projections thereon) when placed on corresponding shelves converge, the major axes in either case being radially from a point P representing the location of the arm, preferably the left arm, of the person operating the scale. The advantage of this arrangement is that by a mere swinging movement of the forearm or a movement of the wrist, the transfer of the weights from one position to another may readily be effected, reducing thereby the manipulations for increasing or decreasing the weighing capacity of the scale to a minimum. The two shelves or benches above the beam however may be parallel to each other, at right angle to the plane of the beam.

By the means described herein the weights and shelves are rendered what is termed "exclusive" permitting the proper seating of pertaining sizes of weights on each other only or on the corresponding shelves only, and while the weights shown are non-circular it is obvious that the same principles of exclusion may be applied to circular weights with circular recesses and projections, the frame, however, being non-central as in the present case.

Owing to this non-central arrangement of the frame or ladder 12 special balancing means are provided for the same. A weight 31 is fixed to the bottom of the ladder at one side of the vertical plane passing medially through the beam to cause the ladder to hang plumb, the weights when properly seated being symmetrically disposed as to said plane. The fixed weight 31 contains a socket 32 to receive an adjustable quantity of shot 33 or the like to cause the hanger to counterbalance the platform of the scale.

Attached to the bottom of the hanger is a guide plate 34 with an aperture through which the guide pin 35 adjustably secured to the brace 36 for the waiting ladder 28 projects. The brace 36 connects this ladder with the upright 3 of the scale.

In order to avoid any grinding action of the suspension means 13 on the knife edges 11 of the beam, a flexing system is provided in said suspension means. This system permits the hanger 12 suspended from the beam to swing to a limited extent at right angle to the beam, the swinging movement being limited by the contact of the hanger with the guide pin which projects from a brace securing the lower part of the companion or waiting ladder to a fixed part of the scale, as for instance to the upright shown in Figure 4.

Flexibility in this suspension system, however, also is necessary since the upward extension on the beam hanger is liable to receive shocks which would then be transmitted with considerable leverage upon the hanger itself. The effect of these shocks is illustrated in Figure 6 by the force indicating arrow 37 showing that the lower part of the hanger 12 would be forced to the right if the force acting on the upward extension 16 is directed towards the left. Owing to the interposition of a flexible system between the knife edges 11 and the hanger 12 a portion of these shocks or of the force is absorbed by the suspension means 13. The suspension means include the ordinary shackle 38 having at its lower end a lug 39 to which the upper margin of a flat spring blade 40 is secured in a plane coinciding with a vertical longitudinal plane through the beam when the scale is at rest. To the lower end of this spring blade 40 another small bracket 41 is secured to which the upper margin of another similar spring blade 42 at right angle to the first named spring blade is secured. While the upper spring blade 40 stands in a vertical plane at right angle to the axis of the knife edges 11, the lower blade 42 will normally occupy a vertical plane containing the axis through the knife edges. The lower spring blade 42 is secured at its margin to the top end of the hanger 12.

In known constructions of hanging supports for counterweights no provision is made for permitting a twisting of this support without producing a grinding action on the knife edges. The construction described above will permit the hanger 12 to twist under the influence of shocks, but this twisting takes place against the torsional resistance of the springs 40, 42. Their resistance will quickly cause the hanger to return to its normal position. The upper spring blade 40 also permits the hanger 12 to swing crosswise of the beam while the lower spring blade 42 will permit a swinging movement upon flexing of said blade in longitudinal direction of the beam. By reference to Figure 6 it will be noted that a force 37 acting in longitudinal direction of the beam would cause a displacement of the hanger below the frame thereof in the opposite direction whereby the lower spring 42 would be subject to a flexing strain, since the swinging movement of the hanger in the above mentioned direction is limited. If the suspension means 13 would not provide for this flexibility the shackle 38 would necessarily move crosswise of the knife edges 11 and a frequent occurrence of this character would detrimentally influence the exactness of the scale. Also the fact that the flexed flat spring 42 is a considerable distance below the knife edges 11 reduces the angle of oscillation of the shackle to a minimum, the angle of oscillation being indicated in dotted lines. The opening in the plate 34 at the lower end of the suspended ladder 12 will limit the swinging movement of the ladder in either direction.

These swinging motions which may take place either as a twist about a vertical axis, or lengthwise or crosswise of the beam, may be designated as whip motions as contrasted with the translational movements of a similarly suspended weight support described in a copending application Serial No. 74,793. Each of the spring blades 40, 42 permits a one-way whip movement while the combination of the blades permits whip movements in all directions. They, therefore, constitute an equivalent to a single flexible cord. A cord, however, would not be able to control the twisting movement to the same extent as the springs do.

The modified construction of the flexing system as shown in Figure 8 comprises a shackle element 43 partly embracing the knife edges 11 which project laterally from the beam 6. Instead of spring blades, however, pairs of bars 44, 45 are arranged in different planes analogous to the arrangement of the planes of the spring blades 40, 42, these bars having spherical or partly spherical heads 46 at each end. It will be seen that a pair of rods 44 extends through the shackle bracket in a plane parallel to the longitudinal plane of the beam, the lower enlarged end of these bars projecting through another bracket or plate 47 to which also the other pair of rods 45 in a plane at right angles thereto is secured. While, therefore, the upper pair of rods 44 will normally swing in a plane at right angle to the longitudinal axis of the beam, the lower pair of rods 45 may oscillate in a plane parallel to the longitudinal axis of the beam. Here also the whip motion of the suspension in either direction is rendered possible similar to that described in connection with the first mentioned embodiment.

Although the present drawings show the waiting ladder as fixed to the framework of the scale it is obvious that this attachment to a fixed part only is not absolutely essential and that this hanging ladder may be secured to another movable part to influence some mechanism, as, for instance a computing chart, in a manner similar to that disclosed in the copending application Serial No. 80,996.

I claim:

1. A scale having counterweights of different sizes, supports for retaining said weights in operative position, different supports laterally of the first supports for different size weights for retaining the weights in inoperative position, and a carrier for said last named supports incorporated with the scale.

2. A scale having counterweights of different sizes, different supports for retaining said different sized weights in operative position and different supports laterally of the first supports for retaining different sized weights in inoperative position.

3. A scale having counterweights of different sizes, different shelves for retaining said different sized weights in operative position and different shelves laterally of the first named shelves for retaining different sized weights in inoperative position, and a common carrier for the last named shelves incorporated with the scale.

4. A scale having counterweights of different sizes, different shelves for retaining said different sized weights in operative position and different shelves for retaining different sized weights in inoperative position, and a common carrier for the last named shelves incorporated with the scale, corresponding shelves for the same size weights being at equal level when the scale is in balanced condition.

5. A scale having counterweights of different sizes and means for supporting the counterweights in use separate from the inoperative counterweights, including a carrier laterally of the path described by the counterweights in use for retaining said counterweights in inoperative position, the carrier having shelves, one of them adapted to carry a plurality of weights of the same size.

6. In a scale, a support for counterweights, having shelves bearing different seats, and counterweights of different sizes, such weights being adapted to be moved laterally for being seated upon such different seats, respectively.

7. In a scale, counterweights of different sizes, a support for counterweights having laterally accessible shelves for seating different sized weights, and means at one side of said shelves for preventing the seating of any weight on any shelf not pertaining to its size of weight.

8. A scale, having counterweights of different sizes, and having a shelf for each size of weight, such shelves having different seating surfaces on their upper sides arranged to prevent seating of the non-pertaining weights of said shelves, and such weights having, upon their upper sides, seating surfaces identical with those of the pertaining shelves respectively, and, upon their lower sides, surfaces reciprocal to their upper surfaces.

9. A scale, having counterweights of different sizes, and having a shelf laterally accessible from several sides for each size of weight, and a common support for said shelves, said shelves and said support being so arranged relatively to each other that no larger weight can be seated upon a shelf pertaining to smaller size of weight.

10. In a scale, counterweights of different cross-measurements, a shelf for each different size of weight, top seatings on the tops of the shelves and of the weights, bottom seatings on the under sides of the weights, and vertically disposed stop elements, such seatings comprising projections and recesses different for each size of weight, and adapted to cooperate with the vertical elements as stops both internally and externally.

11. A scale, having weights of progressively decreasing sizes, each size having progressively decreasing horizontal dimensions and having a shelf for each size, and a support for such shelves, the shelves having upward projections of progressively decreasing sizes, respectively, the weights having upward projections identical with those of the pertaining shelves, and having recesses in their under sides reciprocal with the upward projection of each, and the support having portions at progressively decreasing horizontal distances from the middles of the projections on the shelves respectively.

12. A scale weight having an upward projection of substantially oblong shape in horizontal cross-section, the projection diminishing upward with a steeper slope followed by a less steep slope.

13. A scale, having counterweights, a support suspended from the beam and having shelves for the counterweights below the beam and above the beam.

14. In a scale, a hanger suspended from the beam of the scale and having shelves for counterweights below the beam, a shelf above the beam and an extension on the hanger to which said last named shelf is secured, the extension being lateral of the suspension element.

15. In a scale, a hanger for counterweights oscillatably supported in the scale, a guide pin and a guide-loop adapted to limit the oscillations of such hanger, the pin projecting upward thru the loop, either of said last named elements being secured to the hanger.

16. In a scale, a hanger for counterweights oscillatably supported in the scale, a guide pin and a guide-loop adapted to limit the oscillations of such hanger, the pin projecting upward thru the loop, the loop being at the side of the hanger.

17. In a scale, a beam, a bearing in the same, a hanger for counterweights, and two superposed interconnected structures, each adapted to twist resiliently in a plane at right angle to the other interposed between the hanger and the bearing.

18. In a scale, a beam, a bearing in the same, a hanger for counterweights, a shackle supported from the bearing, and two superposed interconnected structures each adapted to swing in a plane at right angle to the other and to twist resiliently about its axis, the two structures being interposed between the shackle and the hanger.

19. In a scale, a beam, a bearing in the same, a hanger for counterweights, and two superposed interconnected structures, each adapted to swing in a plane at right angle to the other interposed between the hanger and the bearing, the lower one of said structures being in the vertical plane of the axis of the bearing.

20. In a scale, a beam, a bearing in the same, a hanger for counterweights, and two superposed fixedly connected flat springs in planes at right angle to each other interposed between the hanger and the bearing.

21. In a scale, a beam having a non-circular seat adapted to receive counterweights suspended from the beam, the suspension means including two superposed interconnected structures, each adapted to swing in a plane at right angle to the other and to twist resiliently, said suspension means being adapted to absorb any twisting movement of the hanger relatively to the beam upon the positioning or removal of said non-circular counterweights.

22. In a scale, a hanger and a waiting ladder, each having a shelf bearing a seat for a counterweight, such respective seats being at the same level, and such seats being adapted to seat oblong weights, respectively, with the major axes of such weights converging.

23. In a scale, a hanger and a waiting ladder, each having a shelf bearing a seat for a counterweight, such respective seats being at the same level, such weights being oblong in shape and being adapted to seat themselves on either seat, with their major axes in either case radial from a point representing the location of the arm of the person operating the scale.

In witness whereof I affix my signature.

GEORGE HUTCHINSON.